(12) United States Patent
Tachwali

(10) Patent No.: US 11,675,077 B2
(45) Date of Patent: Jun. 13, 2023

(54) SYSTEMS AND METHODS FOR ANALYZING WAVEFORMS USING PULSE SHAPE INFORMATION

(71) Applicant: LG INNOTEK CO., LTD., Seoul (KR)

(72) Inventor: Yahia Tachwali, Princeton, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 177 days.

(21) Appl. No.: 17/194,391

(22) Filed: Mar. 8, 2021

(65) Prior Publication Data

US 2022/0283305 A1    Sep. 8, 2022

(51) Int. Cl.
| | |
|---|---|
| G01S 17/10 | (2020.01) |
| G06F 17/18 | (2006.01) |
| G01S 7/487 | (2006.01) |
| G01S 17/93 | (2020.01) |

(52) U.S. Cl.
CPC .............. *G01S 17/10* (2013.01); *G01S 7/487* (2013.01); *G01S 17/93* (2013.01); *G06F 17/18* (2013.01)

(58) Field of Classification Search
CPC .......... G01S 17/10; G01S 7/487; G01S 17/93; G01S 17/58; G01S 17/931; G01S 7/4865; G06F 17/18
See application file for complete search history.

(56) References Cited

U.S. PATENT DOCUMENTS

| | | | |
|---|---|---|---|
| 2018/0253404 A1* | 9/2018 | Moore | .................. G01S 7/4863 |
| 2018/0299552 A1 | 10/2018 | Shu et al. | |
| 2018/0364360 A1* | 12/2018 | Zellinger | ................ G01S 17/10 |
| 2020/0284907 A1 | 9/2020 | Gupta et al. | |

(Continued)

FOREIGN PATENT DOCUMENTS

CA    2842814 A1    8/2014

OTHER PUBLICATIONS

Aull B., et al., "Large-Format Geiger-Mode Avalanche Photodiode Arrays and Readout Circuits," IEEE Journal of Selected Topics in Quantum Electronics, vol. 24, No. 2, Mar./Apr. 2018.

(Continued)

*Primary Examiner* — Jonathan M Hansen
(74) *Attorney, Agent, or Firm* — Birch, Stewart, Kolasch & Birch, LLP

(57) ABSTRACT

Systems/methods for operating a LiDAR system. The methods comprise: receiving a waveform representing light which was reflected off of a surface of an object; generating timestamp values for photon detection events triggered by pulses in the waveform; generating a count histogram of the timestamp values; inferring a trials histogram from the count histogram (the trials histogram representing a number of times a photodetector of the LiDAR system was available during reception of the waveform); generating an estimated range distance from the LiDAR system to the at least one object and an estimated intensity value for a given pulse of the waveform, based on results from analyzing the count histogram and the trials histogram; determining a position using the estimated range distance from the LiDAR system to the at least one object; and producing a LiDAR dataset comprising a data point defined by the position and the estimated intensity value.

20 Claims, 15 Drawing Sheets

(56) References Cited

U.S. PATENT DOCUMENTS

| | | | | |
|---|---|---|---|---|
| 2020/0386893 A1* | 12/2020 | Gupta | ................... | G01J 1/4204 |
| 2022/0187430 A1* | 6/2022 | Kulesh | ................. | G01S 7/4876 |
| 2022/0381918 A1* | 12/2022 | Denham | ............... | G01S 7/4863 |

OTHER PUBLICATIONS

Kashani, A. et al., "A Review of LIDAR Radiometric Processing: From Ad Hoc Intensity Correction to Rigorous Radiometric Calibration," Sensors 2015, 15, 28099-28128; doi:10.3390/s151128099, pp. 28100-28128.

"Lidar Data," Humboldt State University, GSP 216 Introduction of Remote Sensing, http:P//gsp.humboldt.edu/OLM/Courses/GSP_216_Online/lesson7-1/data.html, Nov. 11, 2020, pp. 1-5.

"How Does LiDAR Work?," http://www.lidar-uk.com/how-lidar-works/, Nov. 11, 2020, pp. 1-2.

* cited by examiner

SYSTEMS AND METHODS FOR ANALYZING WAVEFORMS USING PULSE SHAPE INFORMATION

BACKGROUND

Statement of the Technical Field

The present disclosure relates to implementing systems and methods for analyzing waveforms using pulse shape information.

Description of the Related Art

Modern day vehicles have at least one on-board computer and have internet/satellite connectivity. The software running on these on-board computers monitor and/or control operations of the vehicles. If the vehicle is an autonomous vehicle, then it needs to be able to predict trajectories of agents/actors in a scene in order to make safe and efficient behavior decisions. These trajectories may be predicted using light detection and ranging (LiDAR) data generated by LiDAR systems coupled to the vehicles. The LiDAR systems can comprise photon counting based LiDAR systems (e.g., Geiger mode based sensor/detector array).

Reliable range and intensity estimation for objects at various reflectivity is a challenging problem for the photon counting based LiDAR systems. Each LiDAR system emits a light waveform and receives a waveform representing the light which was reflected off of the surface of at least one object. As the pulse intensity of a received waveform increases, a pile-up effect in an avalanche histogram for the photo-diodes of the LiDAR system becomes more apparent. The pile-up effect causes range-walk (i.e., a received light pulse with high intensity is skewed at the beginning of the pulse so the sample measurement is inaccurate) which has a negative effect on range estimations for objects.

SUMMARY

The present disclosure concerns implementing systems and methods for operating a LiDAR system. The methods comprise: receiving a waveform representing light which was reflected off of a surface of at least one object; generating a plurality of timestamp values for photon detection events triggered by pulses in the waveform; generating a count histogram of the timestamp values; inferring a trials histogram from the count histogram (the trials histogram representing a number of times a photodetector of the LiDAR system was available during reception of the waveform); generating an estimated range distance from the LiDAR system to the at least one object and an estimated intensity value for a given pulse of the waveform, based on results from analyzing the count histogram and the trials histogram; determining a position using the estimated range distance from the LiDAR system to the at least one object; and producing a LiDAR dataset comprising a data point defined by the position and the estimated intensity value. The LiDAR dataset may be used to control operations (e.g., autonomous driving operations) of a vehicle.

The estimated intensity value represents an estimate value for a return strength of a pulse. In some scenarios, the estimated intensity value is set equal to a maximum likelihood estimation of pulse intensity given a pulse shape, the count histogram and the trials histogram. The maximum likelihood estimation of pulse intensity is selected from a plurality of possible intensity values each determined using a linear combination of the count histogram and the trials histogram. Each intensity value is determined in accordance with mathematical equation $$\lambda_j = \frac{\sum_{i=0}^{S-1} k_i}{\sum_{i=0}^{S-1}\left(n_i - \frac{k_i}{2}\right) f(i, \tau = j)} \quad (1)$$

where s represents a span size of at least a portion of the count histogram, $f(i, \tau=j)$ represents a known pulse shape of a waveform at bin index i that has a centroid at waveform offset $\tau$, $n_i$ represents a trials count at bin i, i represents a location of a bin index in the trials histogram that corresponds to a given pulse, and $k_i$ represents a count number of a given pulse detection event at bin index i.

The estimated range distance is set equal to a maximum likelihood estimation of range distance given a plurality of possible intensity values. In some scenarios, the maximum likelihood estimation of range distance is determined by performing comparison operations in which the count histogram is compared with a plurality of computed reference histograms given certain conditions. Each comparison operation produces a probability score representing a probability that the timestamp values were caused by given possible values for parameters $\tau_j$ and $\lambda_j$. The probability score is defined by mathematical equation $$L_j(\text{score}) = \sum_{i=0}^{s-1} k_i \log\left(1 - e^{-\lambda f(i,\tau=j)}\right) - (n_i - k_i)\lambda f(j, \tau = j)$$

were $\lambda$ represents a given previously computed intensity value $\lambda_j$, and $\tau$ represents a timestamp value which is set to a pre-defined value j associated with the given previously computed intensity value $\lambda_j$.

The implementing systems comprise: a processor; and a non-transitory computer-readable storage medium comprising programming instructions that are configured to cause the processor to implement the above described methods.

BRIEF DESCRIPTION OF THE DRAWINGS

The present solution will be described with reference to the following drawing figures, in which like numerals represent like items throughout the figures.

DETAILED DESCRIPTION

Figure 1:
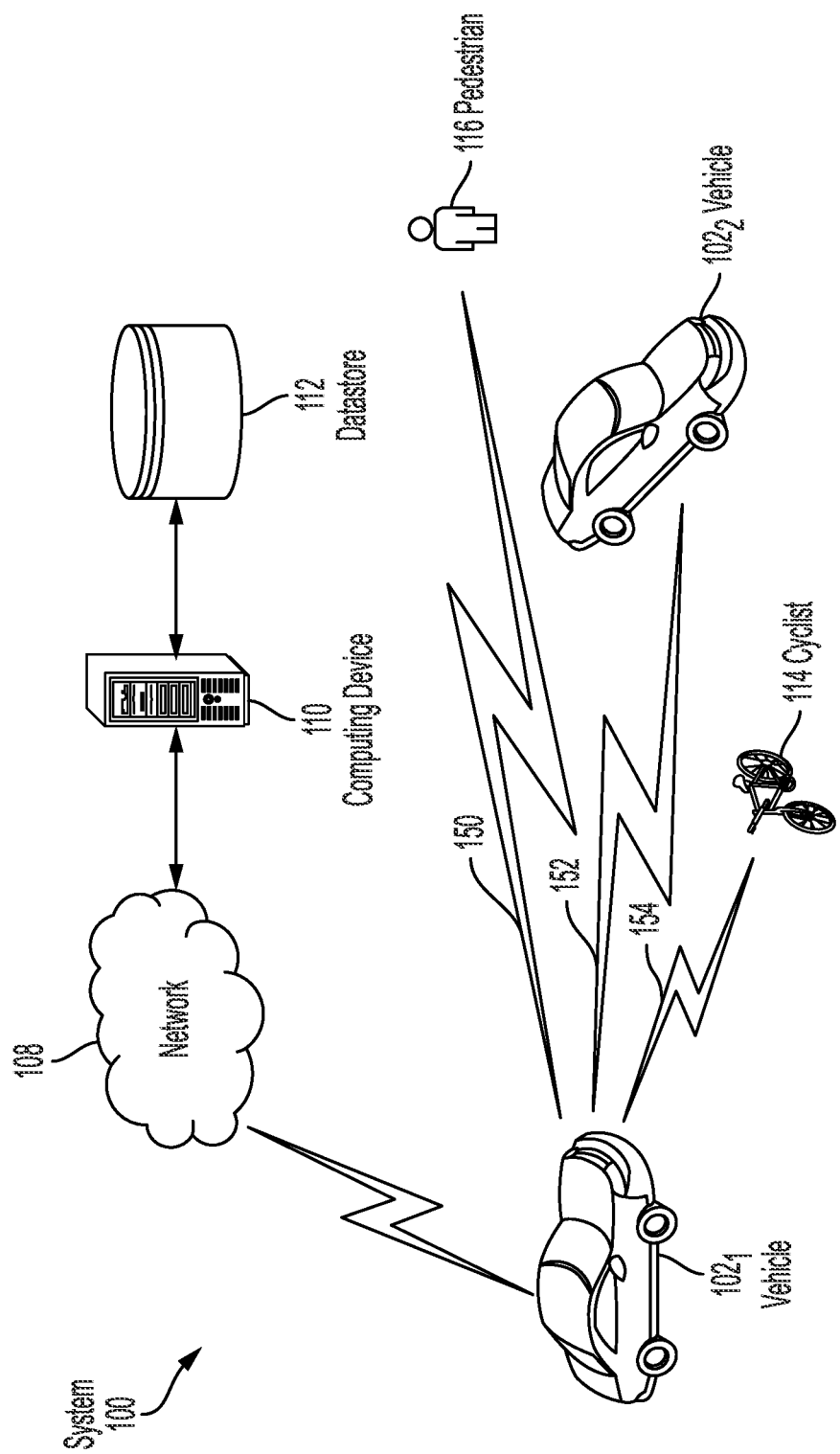
FIG. 1 is an illustration of an illustrative system.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

As noted above, reliable range and intensity estimation for objects at various reflectivity is a challenging problem for photon counting based LiDAR systems (e.g., Geiger mode based sensor/detector array). Each LiDAR system emits a light waveform and receives a waveform representing the light which was reflected off of the surface of at least one object. As the pulse intensity of a received waveform increases, a pile-up effect in an avalanche histogram for the photo-diodes of the LiDAR system becomes more apparent. The pile-up effect causes range-walk (i.e., a received light pulse with high intensity is skewed at the beginning of the pulse so the sample measurement is inaccurate) which has a negative effect on range estimations for objects. Additionally, due to shot noise in the photon-triggered avalanche counts as well as the possibility of photodetector saturation in certain operation conditions, estimating the intensity of a received pulse can be particularly challenging. These problems are solved by the present solution.

Figure 12A:
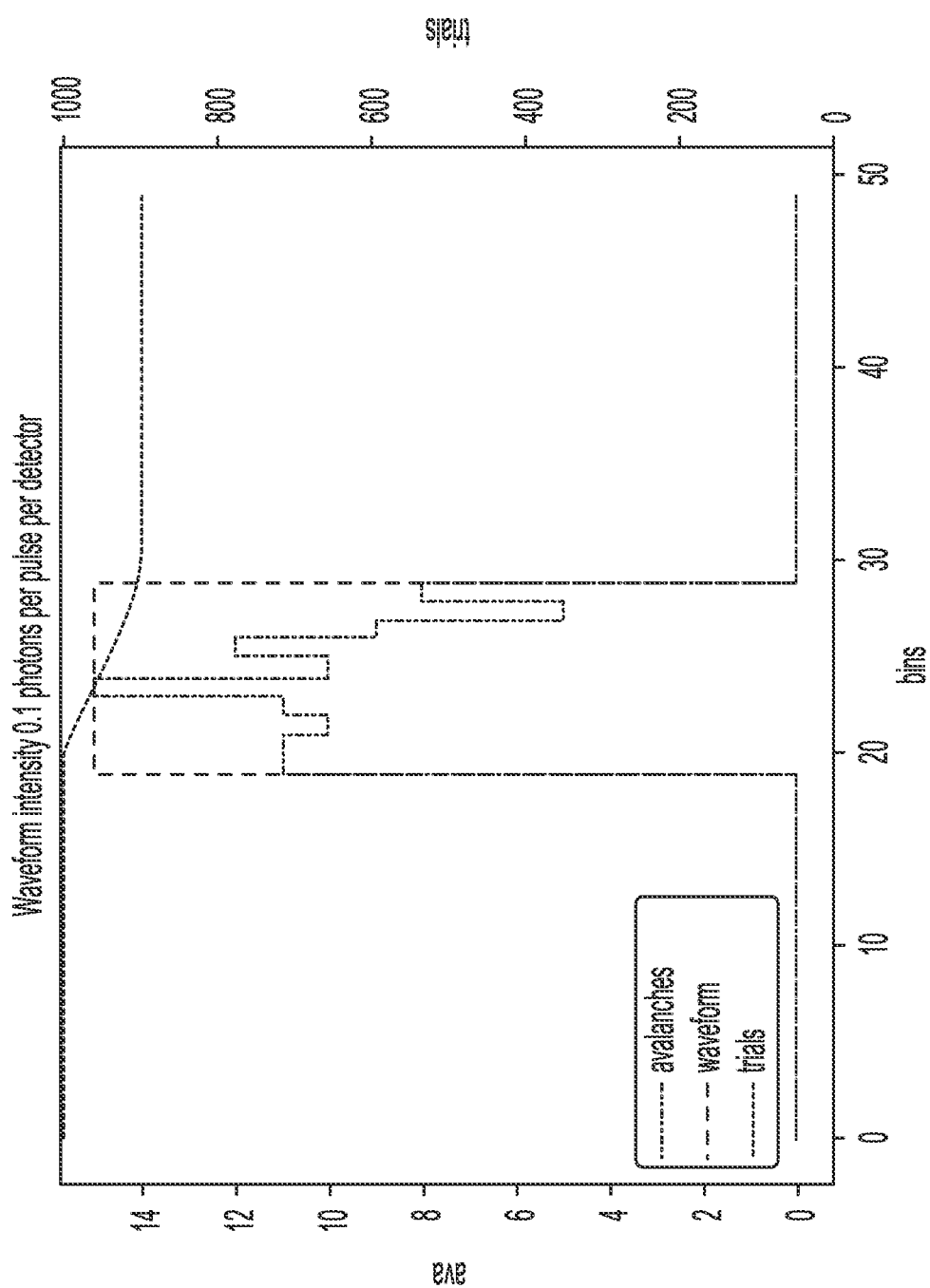
FIGS. 12A, 12B and 12C (collectively referred to as "FIG. 12") provide graphs that demonstrate the effect of range walk.
Figure 12B:
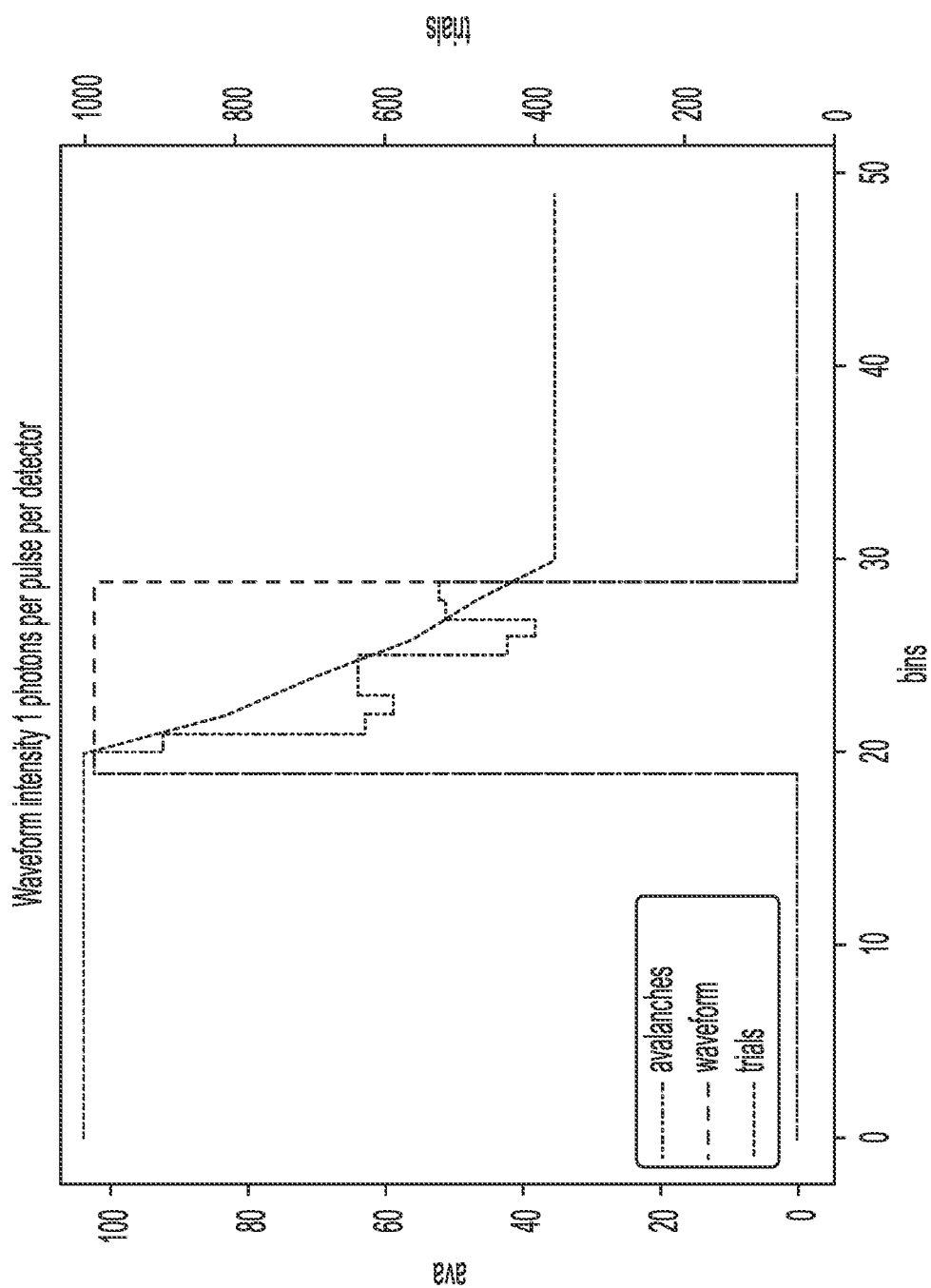
Figure 12C:
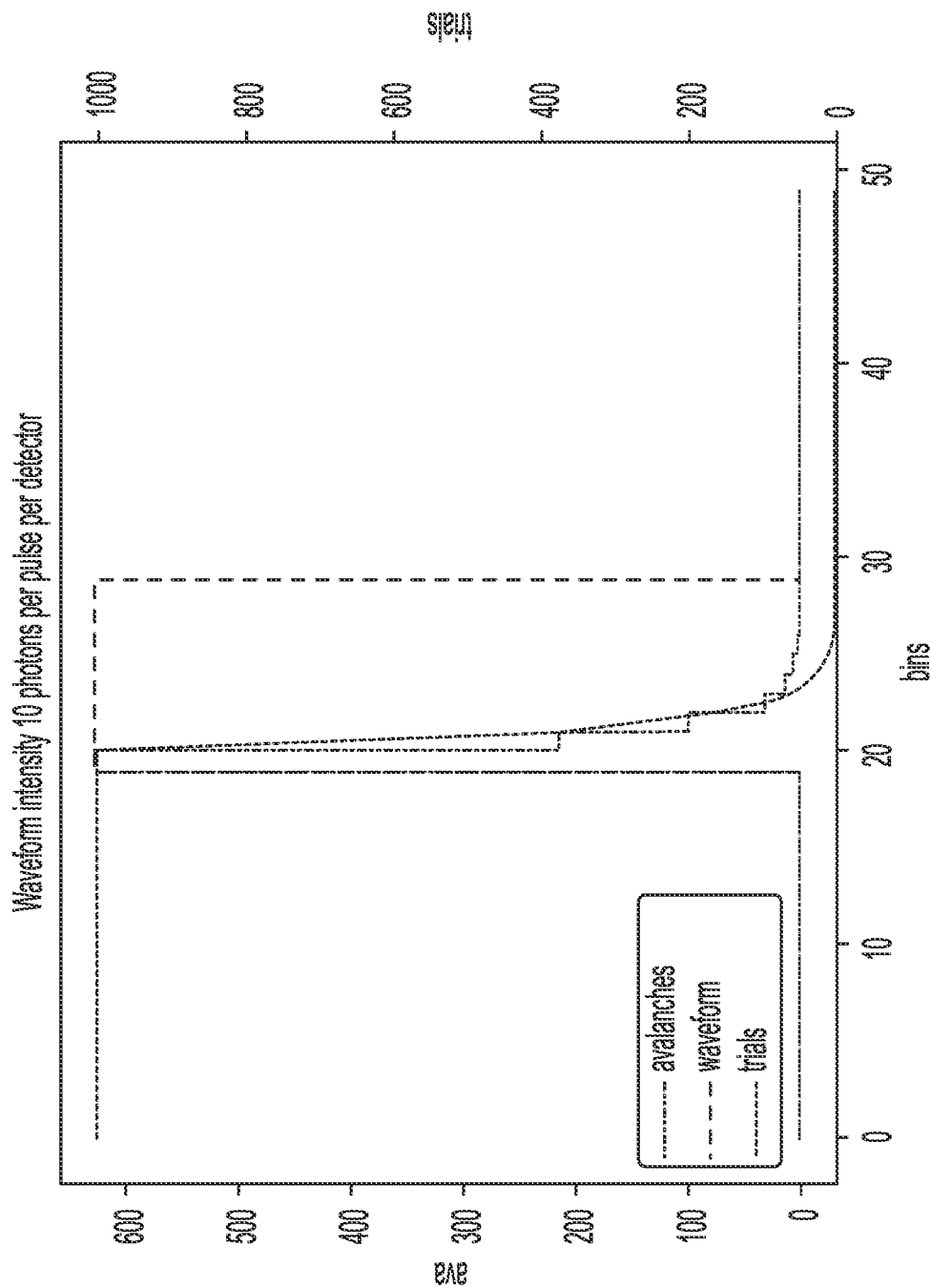

The graphs of FIG. 12 demonstrate the effect of range-walk. In FIG. 12, the count histogram observed from receiving a rectangular pulse (shown as dashed line) when the received intensity is 0.1, 1, and 10 photons per pulse per detector. When the intensity is 0.1, the probability of having an avalanche (count) is more uniform along the span of the pulse, as a result, the received count histogram is closer to the rectangular shape (In reality, the earlier bins have slightly higher chance of avalanching then later ones but since the difference is small, the decay in probability of avalanche is not noticeable and it appears as if the avalanche probability is uniform across the span of the pulse). When the intensity is 1, the earlier bins probability of avalanche appears to have higher probability of avalanches than later bins and this is due to the disarming operation of the detector after avalanche event. As a result, the histogram is more skewed to the left (earlier bins). This skewness is even stronger when the intensity is 10, where most of the probability of avalanches in such high intensity condition is in the first bin in the received pulse, and much less in later bins.

The present solution provides systems and methods for analyzing waveforms using pulse shape information. The waveform analysis corrects the effects of range walk, accurately estimates intensity under pulse saturation, and provides robust range and intensity estimations with clipped pulses. Pulse saturation and clipped pulses occur when too much light is received by the LiDAR system. The range and intensity estimations are based on a maximum likelihood estimation technique. Traditional ranging methods such as center of gravity, zero crossing and constant fraction discriminator have lower precisions as compared to that of the present solution since they do not exploit fully the pulse shape information.

Figure 8:
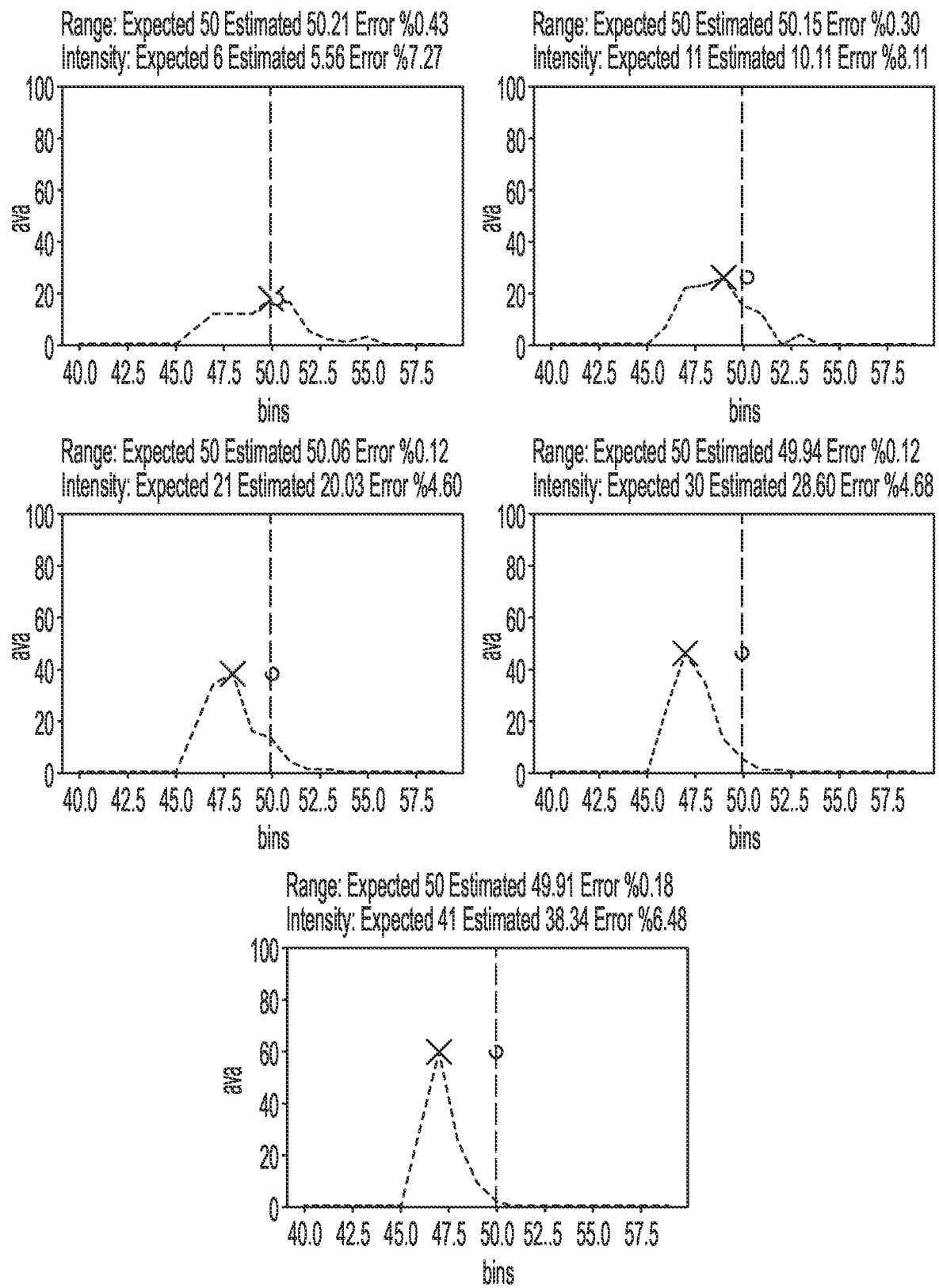
FIG. 8 provides a graph demonstrating the ability of the present solution to estimate the range of an object (which is expected to be at bin 50 that corresponds to the center of the pulse) at increasing intensity without bias.

The graph of FIG. 8 demonstrates the ability of the present solution to estimate the range of an object (which is expected to be at bin 50 that corresponds to the center of the pulse) at increasing intensity without bias. In FIG. 8, a histogram is shown when the received intensity is 6, 11, 21, 30, 41 photon per pulse. The vertical line shows the center of the pulse that the proposed algorithm aims to estimate.

The cross indicate the maximum point of the received count histogram and the x coordinate of the dot close to the vertical line indicates the estimated center of pulse. It can be seen that this estimate is consistent across different received intensity and skewness of the count histogram.

Figure 9:
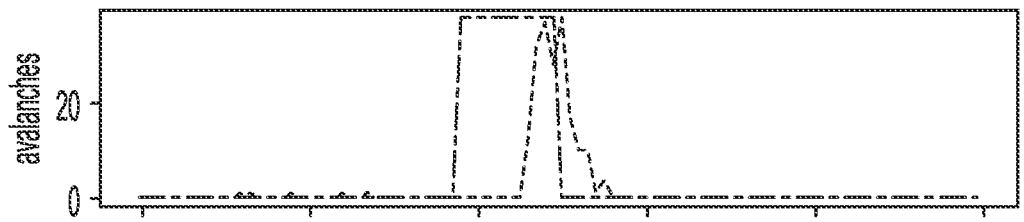
FIG. 9 provides a graph demonstrating that the present solution is capable of analyzing a waveform even if up to half of the pulse is clipped.
Figure 9:
Figure 9:
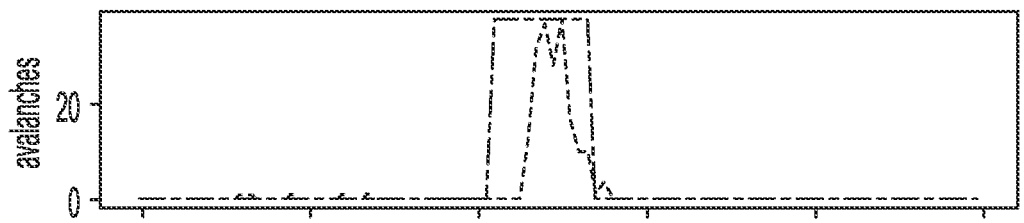
Figure 9:
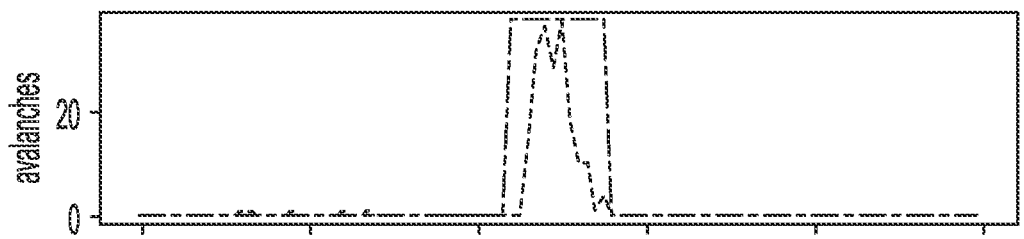

The graph of FIG. 9 demonstrates that the present solution is capable of analyzing a waveform even if up to half of the pulse is clipped. More specifically, FIG. 9 shows the results of this proposed algorithm when the analyzed portion of the received count histogram is contained within the rectangular box. It shows that if this box contains more than half of the waveform, the algorithm is capable of successfully estimate the proper offset and intensity of the pulse. The expected received intensity is eight photons per pulse. FIG. 9 shows four overlapping conditions, the first one has just below half of the pulse and therefore the estimated intensity is almost half of the actual one. Once the box contain more than half of the waveform as shown in the second, third and fourth case, the corresponding intensity and range estimates became consistent regardless of the percentage of waveform that is captured (as long as it is more than half of it).

The methods generally comprise operations for analyzing LiDAR return waveforms to more accurately estimate pulse intensities and range distances to objects. The operations include: emitting light from a LIDAR system (e.g., 100 pulses of light); receiving, by a photon-counting based sensor (e.g., Geiger mode based sensor/detector array) of the LiDAR system, a waveform representing the light which was reflected off of the surface of at least one object; generating a timestamp value for each detection of a pulse in the received waveform (each timestamp value representing the time of flight of a given pulse in the emitted light waveform; generating a count histogram of the timestamp values (e.g., a graph plotting the timestamp values); inferring a trials histogram from the count histogram that represents how many times a given photodetector of the photon-counting based sensor was available during the pulse detections of the received waveform; and analyzing the count histogram and the trials histogram to generate an estimated range distance d to the object and an estimated intensity value $\lambda$.

The estimated intensity value $\lambda$ represents an estimate value for the return strength (magnitude) of a laser pulse, and is set equal to a maximum likelihood estimation of pulse intensity given a known pulse shape, the count histogram and the trials histogram. The return strength of a pulse depends on the reflectivity of the object. Thus, the present solution involves computing a plurality of possible intensity values $\lambda_j$ given a known pulse shape, where j is a pre-defined integer (e.g., 1-20). Each intensity value $\lambda_j$ is generated by implementing a linear combination of the count histogram and the trials histogram.

The estimated range distance d represents an estimated distance between the LiDAR system and the object. The estimated range distance d is set equal to a maximum likelihood estimation of range distance given the plurality of possible intensity values $\lambda_j$. The maximum likelihood estimation of range distance is determined generally by comparing the count histogram with each of a plurality of computed reference histograms given certain conditions, and identifying the condition under which the count histogram results in the best match measured by a probability score Lj. Each comparison operation may produce a probability score Lj representing a probability that the measured timestamp values were caused by given possible values for parameters $\tau_j$ and $\lambda_j$.

The operations also involve: selecting the value for $\tau_j$ and $\lambda_j$ which has the maximum probability score Lj associated therewith; setting the estimated range distance d equal to the selected value for $\tau_j$ and set the estimated intensity value $\lambda$ equal to the selected value for $\lambda_j$; calculating a position (x-coordinate, y-coordinate, z-coordinate) using the location and orientation of the LiDAR system, an angle of the LiDAR system, and the estimated range distance $\tau$ to the object; repeating the above operations for each LiDAR data point; and producing a LiDAR dataset defining a point cloud. Each data point of the point cloud has the following attributes associated therewith: a position (x-coordinate, y-coordinate, z-coordinate); and an intensity value. In some scenarios, the LiDAR dataset is optionally used to control operations of an autonomous vehicle (e.g., for feature detection/extraction and/or Lidar point classification (e.g., ground, vegetation, building, water, rail, road surface, wire, bridge, vehicle, etc.)).

The present solution is being described herein in the context of an autonomous vehicle. The present solution is not limited to autonomous vehicle applications. The present solution can be used in other applications such as robotic application, Artificial Intelligence (AI) applications, metric applications, and/or system performance applications.

Illustrative Systems

Referring now to FIG. 1, there is provided an illustration of an illustrative system 100. System 100 comprises a vehicle $102_1$ that is traveling along a road in a semi-autonomous or autonomous manner. Vehicle $102_1$ may be an AV. The AV $102_1$ can include, but is not limited to, a land vehicle (as shown in FIG. 1), an aircraft, or a watercraft.

AV $102_1$ is generally configured to detect objects $102_2$, 114, 116 in proximity thereto. The objects can include, but are not limited to, a vehicle $102_2$, a cyclist 114 (such as a rider of a bicycle, electric scooter, motorcycle, or the like) and/or a pedestrian 116. This object detection can be made, for example, by analyzing sensor data generated by at least one sensor device on the AV $102_1$ and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle an any entity that may affect, or may be affected by, the vehicle. The information can include, but is not limited to, information specifying actions or operations have been performed, being performed and/or are to be performed by the object.

When such a detection is made, AV $102_1$ performs operations to: generate one or more possible object trajectories for the detected object; determine one or more object classifications, goals and/or future intentions for the detection object; and use the at least one of the generated possible object trajectories, object classifications, goals and future intentions to facilitate a determination of a vehicle trajectory. The AV $102_1$ may then perform operations to follow the vehicle trajectory.

In some scenarios, the AV $102_1$ performs additional operations to determine whether or not there is an undesirable level of risk that a collision will occur between the AV and object in a threshold period of time (e.g., 1 minute). If so, the AV $102_1$ performs operations to determine whether the collision can be avoided if the vehicle trajectory is followed by the AV $102_1$ and any one of a plurality of dynamically generated emergency maneuvers is performed in pre-defined time period (e.g., N milliseconds). If the collision can be avoided, then the AV $102_1$ takes no action or optionally performs a cautious maneuver (e.g., mildly slows down). In contrast, if the collision cannot be avoided, then the AV $102_1$ immediately takes an emergency maneuver (e.g., brakes and/or changes direction of travel).

Figure 2:
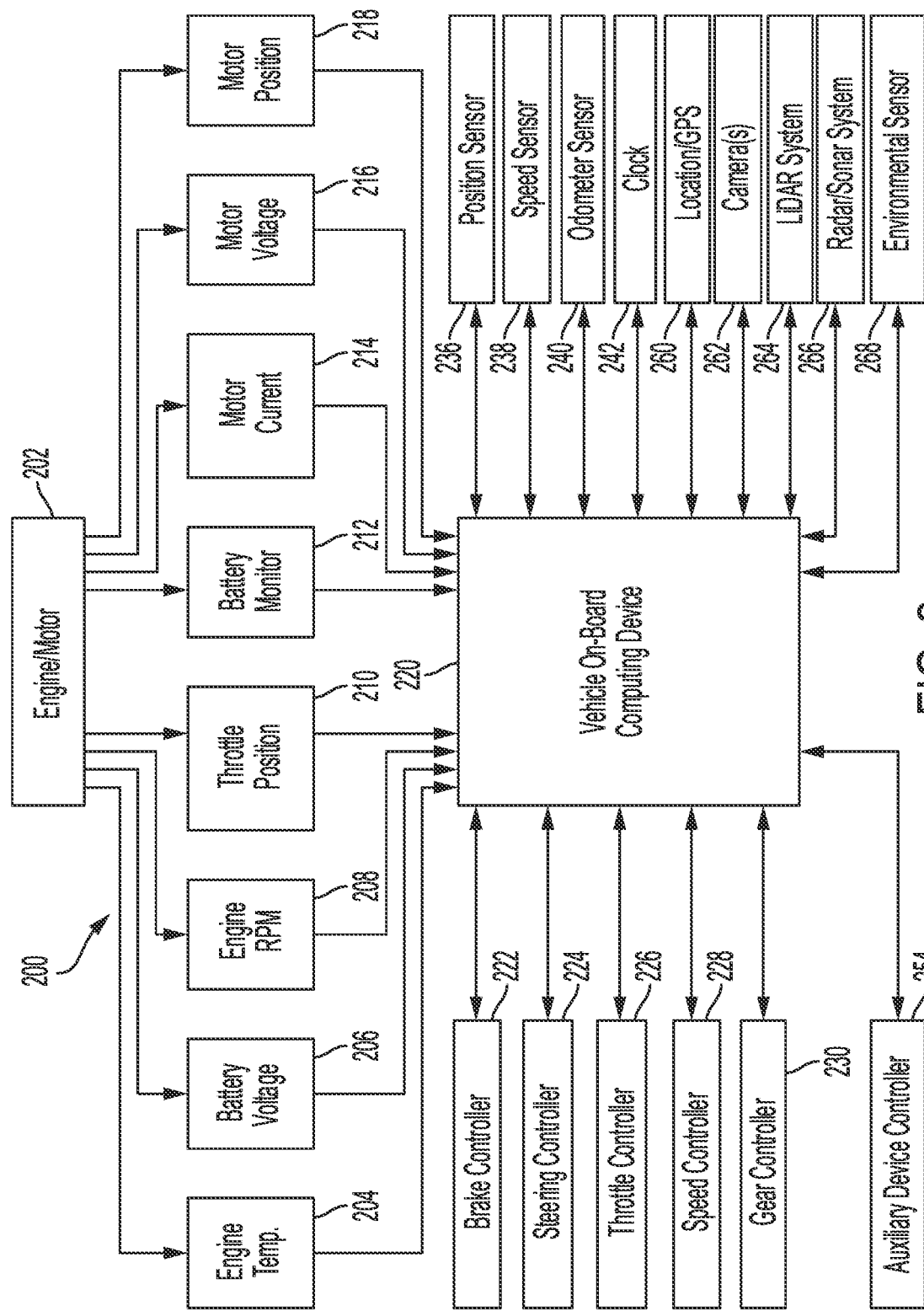
FIG. 2 is an illustration of an illustrative architecture for a vehicle.

Referring now to FIG. 2, there is provided an illustration of an illustrative system architecture 200 for a vehicle. Vehicles $102_1$ and/or $102_2$ of FIG. 1 can have the same or similar system architecture as that shown in FIG. 2. Thus, the following discussion of system architecture 200 is sufficient for understanding vehicle(s) $102_1$, $102_2$ of FIG. 1.

As shown in FIG. 2, the vehicle 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute (RPM) sensor 208, and a throttle position sensor 210. If the vehicle is an electric or hybrid vehicle, then the vehicle may have an electric motor, and accordingly will have sensors such as a battery monitoring system 212 (to measure current, voltage and/or temperature of the battery), motor current 214 and voltage 216 sensors, and motor position sensors such as resolvers and encoders 218.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 (e.g., a Global Positioning System (GPS) device); object detection sensors such as one or more cameras 262; a LiDAR sensor system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to an on-board computing device 220. The on-board computing device 220 analyzes the data captured by the sensors and optionally controls operations of the vehicle based on results of the analysis. For example, the on-board computing device 220 may control: braking via a brake controller 232; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as LiDAR system 264 is communicated from those sensors to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

LiDAR information is communicated from LiDAR system 264 to the on-board computing device 220. Additionally, captured images are communicated from the camera(s) 262 to the on-board computing device 220. The LiDAR information and/or captured images are processed by the on-board computing device 220 to detect objects in proximity to the vehicle 200.

When the on-board computing device 220 detects a moving object, the on-board computing device 220 will generate one or more possible object trajectories for the detected object, and analyze the possible object trajectories to assess the risk of a collision between the object and the AV. If the risk exceeds an acceptable threshold, the on-board computing device 220 performs operations to determine whether the collision can be avoided if the AV follows a defined vehicle trajectory and/or implements one or more dynamically generated emergency maneuvers is performed in a pre-defined time period (e.g., N milliseconds). If the collision can be avoided, then the on-board computing device 220 may cause the vehicle 200 to perform a cautious maneuver (e.g., mildly slow down, accelerate, or swerve). In contrast, if the collision cannot be avoided, then the on-board computing device 220 will cause the vehicle 200 to take an emergency maneuver (e.g., brake and/or change direction of travel).

Figure 3:
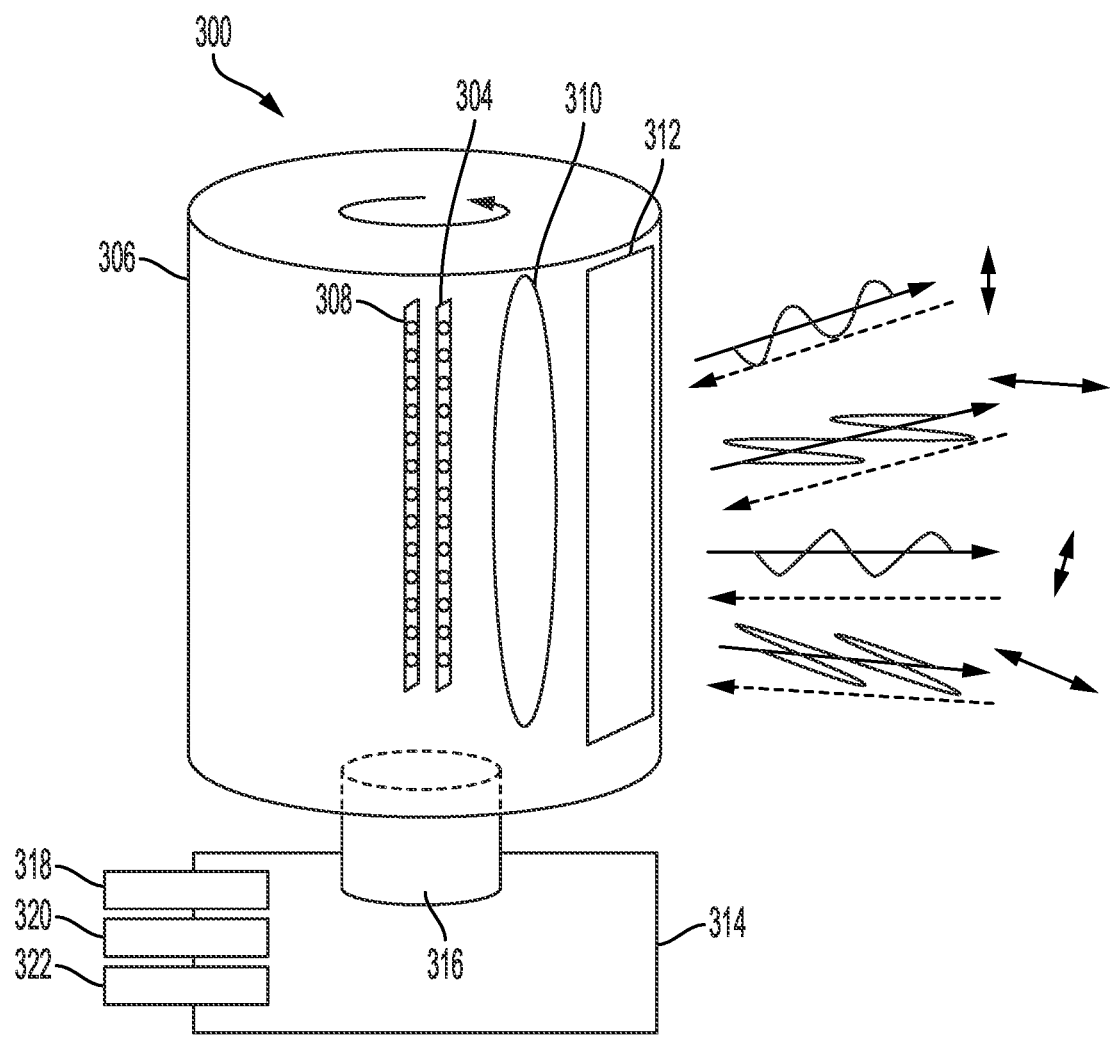
FIG. 3 is an illustration of an illustrative LiDAR system.

Referring now to FIG. 3, there is provided an illustration of an illustrative LiDAR system 300. LiDAR system 264 of FIG. 2 may be the same as or substantially similar to the LiDAR system 300. As such, the discussion of LiDAR system 300 is sufficient for understanding LiDAR system 264 of FIG. 2.

As shown in FIG. 3, the LiDAR system 300 includes a housing 306 which may be rotatable 360° about a central axis such as hub or axle 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the LiDAR system 300 can emit light through one or more of the aperture(s) 312 and receive reflected light back toward one or more of the aperture(s) 211 as the housing 306 rotates around the internal components. In an alternative scenarios, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit a waveform (including pulses of light (e.g., 100 pulses of light) through the aperture 312 or through the transparent dome of the housing 306 via one or more laser emitter chips or other light emitting devices. The emitter system 304 may include any number of individual emitters (e.g., 8 emitters, 64 emitters, or 128 emitters). The emitters may emit light of substantially the same intensity or of varying intensities. The individual beams emitted by the light emitter system 304 will have a well-defined state of polarization that is not the same across the entire array. As an example, some beams may have vertical polarization and other beams may have horizontal polarization. The LiDAR system will also include one or more light detectors 308 each containing a photodetector or an array of photodetectors positioned and configured to receive light reflected back into the system. The array of photodetectors can include, but are not limited to, a Geiger mode avalanche photodiode (GmAPD) array. The GMAPD array can detect a single photon and produce an electrical pulse of sufficient amplitude to directly trigger a logic event in a readout circuit coupled thereto. The readout circuit digitally counts or time stamps photon detection events (i.e., when logic events are triggered by electrical pulses produced by the GMAPD array). The readout circuit can include, but is not limited to, a Complementary Metal Oxide Semiconductor (CMOS) circuit. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror 312 to focus and direct light that is passed through the optical element structure 310. As shown below, the system includes an optical element structure 310 positioned in front of the mirror 312 and connected to the rotating elements of the system so that the optical element structure 310 rotates with the mirror 312. Alternatively or in addition, the optical element structure 310 may include multiple such structures (for example lenses and/or waveplates). Optionally, multiple optical element structures 310 may be arranged in an array on or integral with the shell portion of the housing 306.

Optionally, each optical element structure 310 may include a beam splitter that separates light that the system receives from light that the system generates. The beam splitter may include, for example, a quarter-wave or half-wave waveplate to perform the separation and ensure that received light is directed to the receiver unit rather than to the emitter system (which could occur without such a waveplate as the emitted light and received light should exhibit the same or similar polarizations).

The LiDAR system will include a power unit 318 to power the light emitting unit 304, a motor 316, and electronic components. The LiDAR system will also include an analyzer 314 with elements such as a processor 322 and non-transitory computer-readable medium 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the LiDAR system 300 as shown, or some or all of it may be external to the LiDAR system and communicatively connected to the LiDAR system via a wired or wireless communication network or link.

Figure 4:
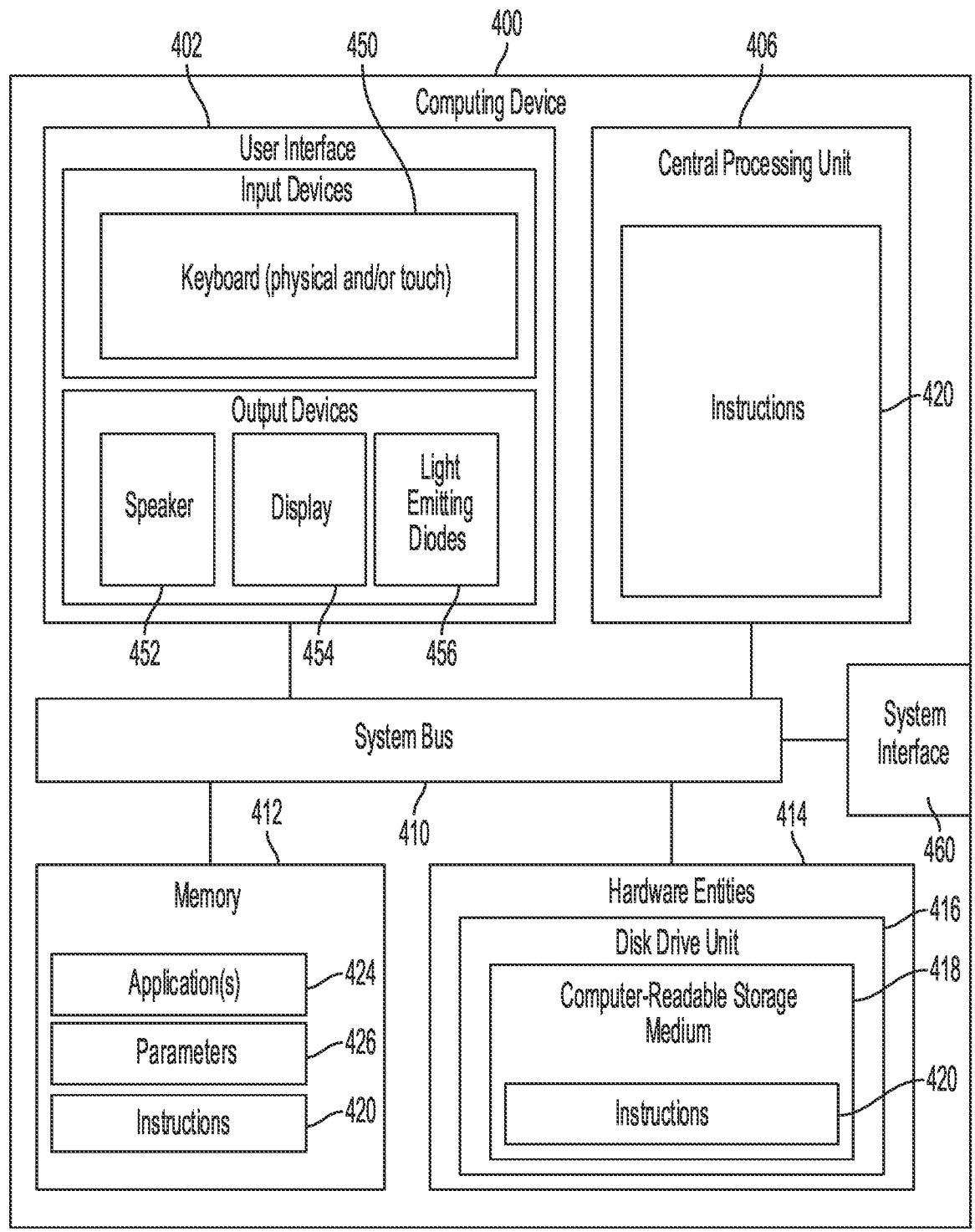
FIG. 4 is an illustration of an illustrative computing device.

Referring now to FIG. 4, there is provided an illustration of an illustrative architecture for a computing device 400. The computing device 110 of FIG. 1 and/or the vehicle on-board computing device 220 of FIG. 2 is/are the same as or similar to computing device 400. As such, the discussion of computing device 400 is sufficient for understanding the computing device 110 of FIG. 1 and the vehicle on-board computing device 220 of FIG. 2.

Computing device 400 may include more or less components than those shown in FIG. 4. However, the components shown are sufficient to disclose an illustrative solution implementing the present solution. The hardware architecture of FIG. 4 represents one implementation of a representative computing device configured to operate a vehicle, as described herein. As such, the computing device 400 of FIG. 4 implements at least a portion of the method(s) described herein.

Some or all components of the computing device 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the computing device 400 comprises a user interface 402, a Central Processing Unit (CPU) 406, a system bus 410, a memory 412 connected to and accessible by other portions of computing device 400 through system bus 410, a system interface 460, and hardware entities 414 connected to system bus 410. The user interface can include input devices and output devices, which facilitate user-software interactions for controlling operations of the computing device 400. The input devices include, but are not limited to, a physical and/or touch keyboard 450. The input devices can be connected to the computing device 400 via a wired or wireless connection (e.g., a Bluetooth® connection). The output devices include, but are not limited to, a speaker 452, a display 454, and/or light emitting diodes 456. System interface 460 is configured to facilitate wired or wireless communications to and from external devices (e.g., network nodes such as access points, etc.).

At least some of the hardware entities 414 perform actions involving access to and use of memory 412, which can be a Random Access Memory (RAM), a disk drive, flash memory, a Compact Disc Read Only Memory (CD-ROM) and/or another hardware device that is capable of storing instructions and data. Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the computing device 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the computing device 400 and that cause the computing device 400 to perform any one or more of the methodologies of the present disclosure.

Figure 5:
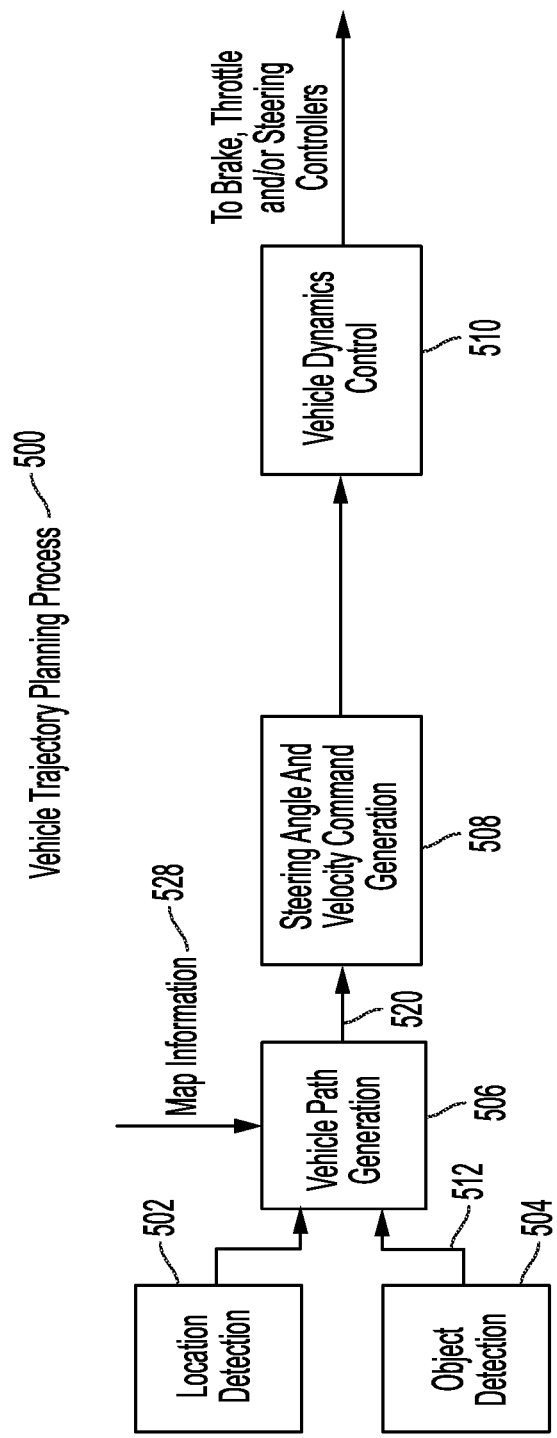
FIG. 5 provides a block diagram that is useful for understanding how vehicles control is achieved in accordance with the present solution.

Referring now to FIG. 5, there is provided a block diagram that is useful for understanding how vehicle control is achieved in accordance with the present solution. All of the operations performed in blocks 502-510 can be performed by the on-board computing device of a vehicle (e.g., AV $102_1$ of FIG. 1).

In block 502, a location of the vehicle is detected. This detection can be made based on sensor data output from a location sensor (e.g., location sensor 260 of FIG. 2) of the vehicle. This sensor data can include, but is not limited to, GPS data. The detected location of the vehicle is then passed to block 506.

In block 504, an object is detected within proximity of the vehicle. This detection is made based on sensor data output from a camera (e.g., camera 262 of FIG. 2), a LiDAR system (e.g., LiDAR system 264 of FIG. 2), and/or a radar/sonar system 264 of the vehicle. Techniques for detecting objects are well known in the art. Any known or to be known object detection technique can be used herein. Information 512 about the detected object is passed to block 506. This information 512 includes, but is not limited to, a track (or spatial description) of the detected object. The track (or spatial description) may comprise at least one predicted trajectory or path of travel of the object, a speed of the object, a full extent of the object, a heading of the object, a direction of travel of the object, classification(s) of the object, goal(s) of the object, and/or predicted future intention(s) of the object. The predicted object trajectory or path of travel can include, but is not limited to, a linear path pointing in the direction of a lane or a curved path pointing in the direction of a lane.

This object detection information 512 output from block 504 can be subsequently used to facilitate at least one autonomous driving operation (e.g., feature detection/extraction, LiDAR point classification (e.g., ground, vegetation, building, water, rail, road, surface, wire, bridge, vehicle, etc.), object tracking operations, object trajectory prediction operations, vehicle trajectory determination operations, and/or collision avoidance operations). For example, the object's current location, predicted object trajectory, and predicted future intentions for the object can be used to determine a vehicle trajectory in block 506, and/or trigger cautious or emergency maneuvers in block 506. The present solution is not limited to the particulars of this example.

In block 506, a vehicle trajectory is generated using the information from blocks 502 and 504. Techniques for determining a vehicle trajectory are well known in the art. For example, in some scenarios, such a technique involves determining a trajectory for the AV that would pass the object when the object is in front of the AV, the object has a heading direction that is aligned with the direction in which the AV is moving, the object is classified as a functionally stopped vehicle, the object is associated with a lane blocking goal, and the object has a predicted future stop intention. The present solution is not limited to the particulars of this scenario. The vehicle trajectory 50 can be determined based on the location information from block 52, the object detection information from block 54, and map information 58 (which is pre-stored in a data store of the vehicle). The vehicle trajectory 50 may represent a smooth path that does not have abrupt changes that would otherwise provide passenger discomfort. For example, the vehicle trajectory is defined by a path of travel along a given lane of a road in which the object is not predicted to travel within a given amount of time. The vehicle trajectory 520 is then provided to block 508.

In block 508, a steering angle and velocity command is generated based on the vehicle trajectory 520. The steering angle and velocity command is provided to block 510 for vehicle dynamics control.

Referring now to FIG. 6, there is provided a flow diagram of an illustrative method 600 for controlling a vehicle (e.g., vehicle 102$_1$ of FIG. 1). At least a portion of method 600 is performed by a vehicle on-board computing device (e.g., vehicle on-board computing device 220 of FIG. 2). Method 600 is performed for each object (e.g., vehicle 102$_2$ of FIG. 1, cyclist 114 of FIG. 1, and/or pedestrian 116 of FIG. 1) that has been detected to be within a distance range from the vehicle at any given time.

Method 600 comprises a plurality of operations 602-630. The present solution is not limited to the particular order of operations 602-630 shown in FIG. 6. For example, the operations of 620 can be performed in parallel with the operations of 604-618, rather than subsequent to as shown in FIG. 6.

Figure 6A:
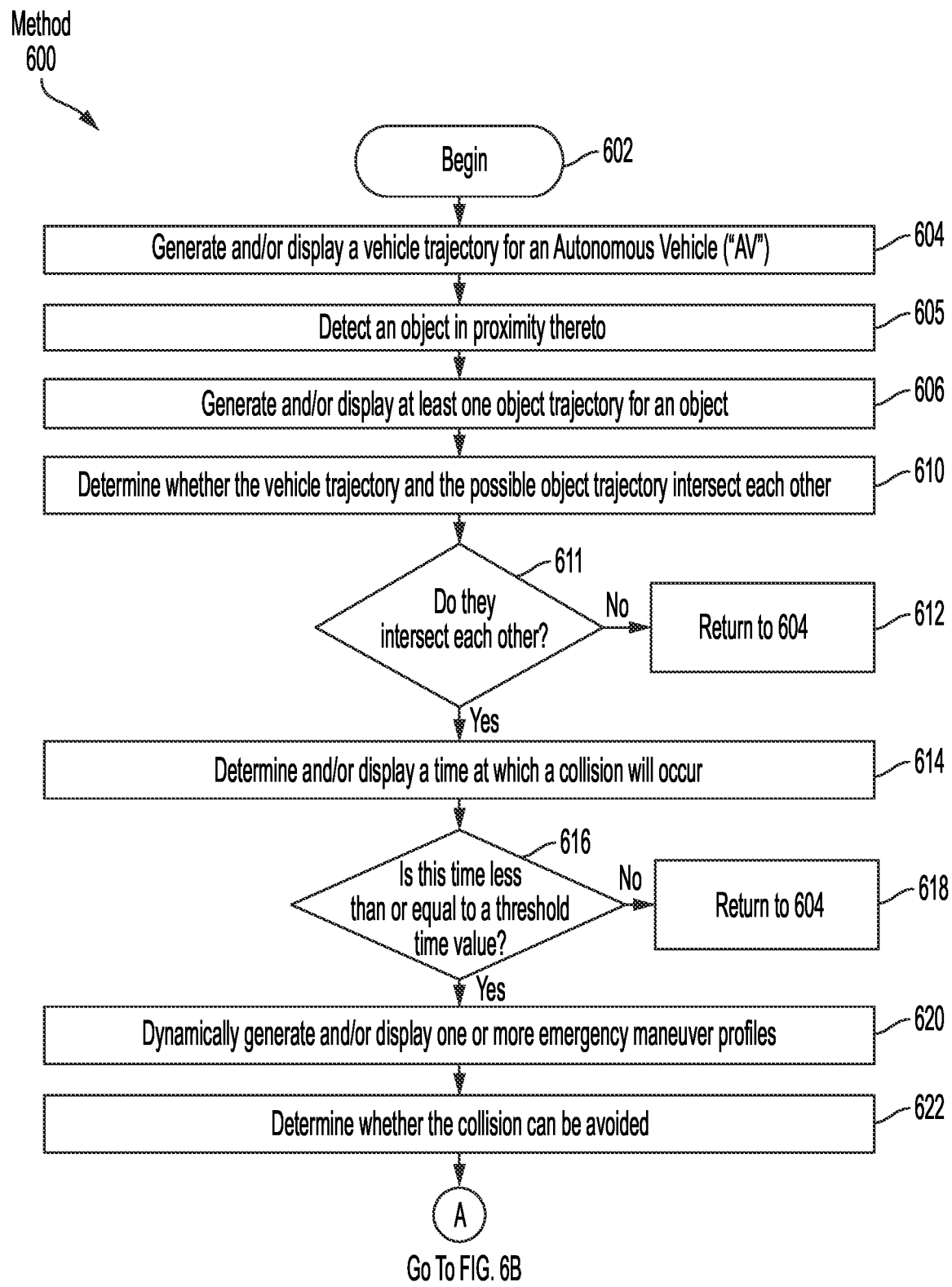
FIGS. 6A-6B (collectively referred to herein as "FIG. 6") provide a flow diagram of an illustrative method for controlling an autonomous vehicle.

As shown in FIG. 6A, method 600 begins with 602 and continues with 604 where a vehicle trajectory (e.g., vehicle trajectory 520 of FIG. 5) for an AV is generated. The vehicle trajectory may represent a smooth path that does not have abrupt changes that would otherwise provide passenger discomfort, or may repent an emergency maneuver to avoid a collision. Techniques for determining a vehicle trajectory are well known in the art. In some scenarios, the vehicle trajectory is determined based on location information generated by a location sensor (e.g., location sensor 260 of FIG. 2) of the AV, object detection information generated by the on-board computing device (e.g., on-board computing device 220 of FIG. 2) of the AV, images captured by at least one camera (e.g., camera 262 of FIG. 2) of the AV, LiDAR datasets generated by at least one LiDAR system (e.g., LiDAR system 264 of FIG. 2), map information stored in a memory (e.g., memory 412 of FIG. 4) of the AV, and/or lane information.

Once the vehicle trajectory is generated, method 600 continues with 605 where the AV performs operations to detect an object that is in proximity thereto. Object detection algorithms are well known in the art. The object detection is then used to facilitate at least one autonomous driving operation (e.g., object tracking operations, object trajectory prediction operations, vehicle trajectory determination operations, and/or collision avoidance operations).

Accordingly, method 600 continues with 606 where one or more possible object trajectories (e.g., possible object trajectories 512 of FIG. 5) are determined for the object (e.g., vehicle 102$_2$, cyclist 114 or pedestrian 116 of FIG. 1) detected in 605. Techniques for determining trajectories for detected objects are well known. In some scenarios, sensor data is used to determine the object trajectories. Other information may be alternatively or additionally used to determine the object trajectories. This other information can include, but is not limited to, information received from a communication device (e.g., a transceiver, a beacon and/or a smart phone) of the object via wireless communication link(s) (e.g., link(s) 150, 152, 154 of FIG. 1). This information can specify actions or operations that have been performed, are being performed and/or are going to be performed by the object. (e.g., turn right/left, change lanes, accelerate/decelerate, a path of travel, etc.).

Next in 610, a determination is made as to whether the vehicle trajectory generated in 604 and the possible object trajectory generated in 606 intersect each other. If they do not intersect each other [611:NO], then 612 is performed where method 600 returns to 604.

In contrast, if they do intersect each other [611:YES], then method 600 continues to 614 where a time value is determined. This time value represents a time at which a collision will occur if the vehicle trajectory is followed by the AV and the possible object trajectory is followed by the object (e.g., which has been classified as a driving vehicle and has a drive intention). The time value determined in 614 is then compared to a threshold time value, as shown by 616. The threshold time value is selected in accordance with a given application (e.g., one or more seconds). If the time value is greater than the threshold time value [616:NO], then 618 is performed where method 600 returns to 604. If the time value is equal to or less than the threshold time value [616:YES], then method 600 continues with 620-622. 620-622 involve: dynamically generating one or more emergency maneuver profiles based on the vehicle trajectory and the possible object trajectory/predicted path of travel; and determine whether the collision can be avoided if the vehicle trajectory is followed by the AV and any one of the emergency maneuvers is performed in a pre-defined time period (e.g., N milliseconds). Upon completing 622, method 600 continues with 624 of FIG. 6B.

Figure 6B:
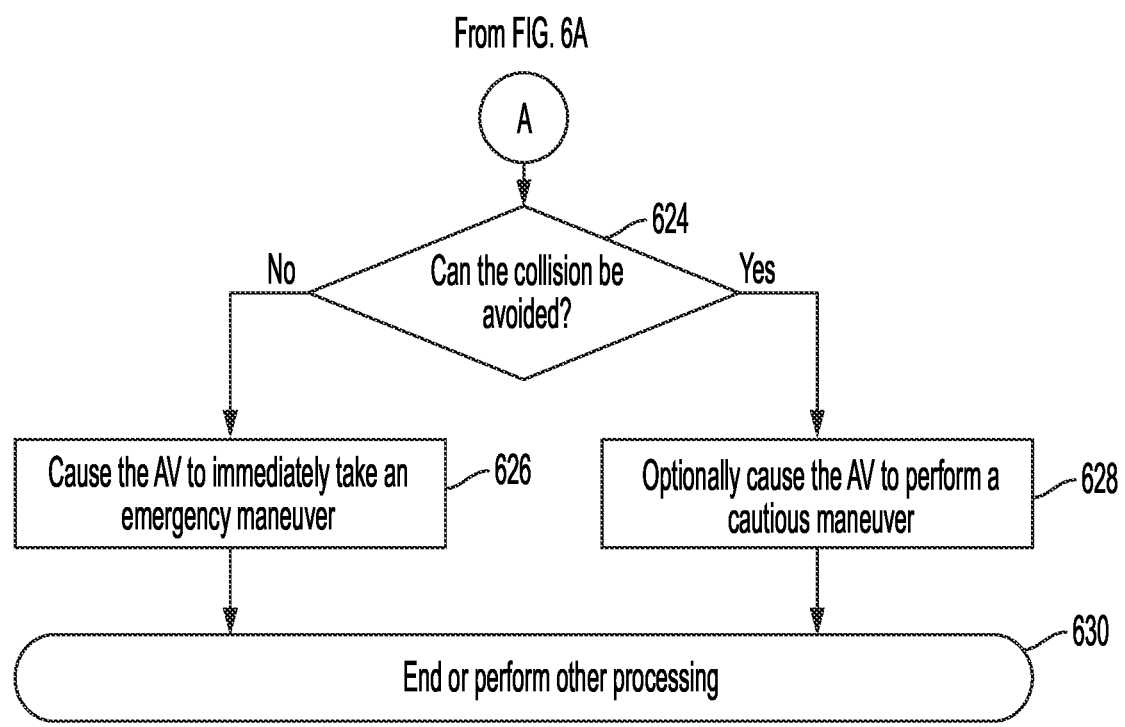

Referring now to FIG. 6B, if the collision cannot be avoided in the pre-defined time period [624:NO], then 626 is performed where the AV is caused to immediately take an emergency maneuver. The emergency maneuver can include, but is not limited to, one of the dynamically generated emergency maneuvers discussed above in relation to 620. Techniques for causing an AV to take emergency maneuvers are well known in the art. Any known or to be known technique for causing an AV to take emergency maneuvers can be used here. Subsequently, 5630 is performed where method 600 ends or other processing is performed.

In contrast, if the collision can be avoided in the pre-defined time period [624:YES], then 628 is performed where the AV is optionally caused to perform a cautious maneuver (e.g., mildly slow down). Techniques for causing an AV to take a cautious maneuver such as slowing down are well known in the art. Any known or to be known technique for causing an AV to take a cautious maneuver can be used here. Subsequently, 630 is performed where method 600 ends or other processing is performed.

Figure 7:
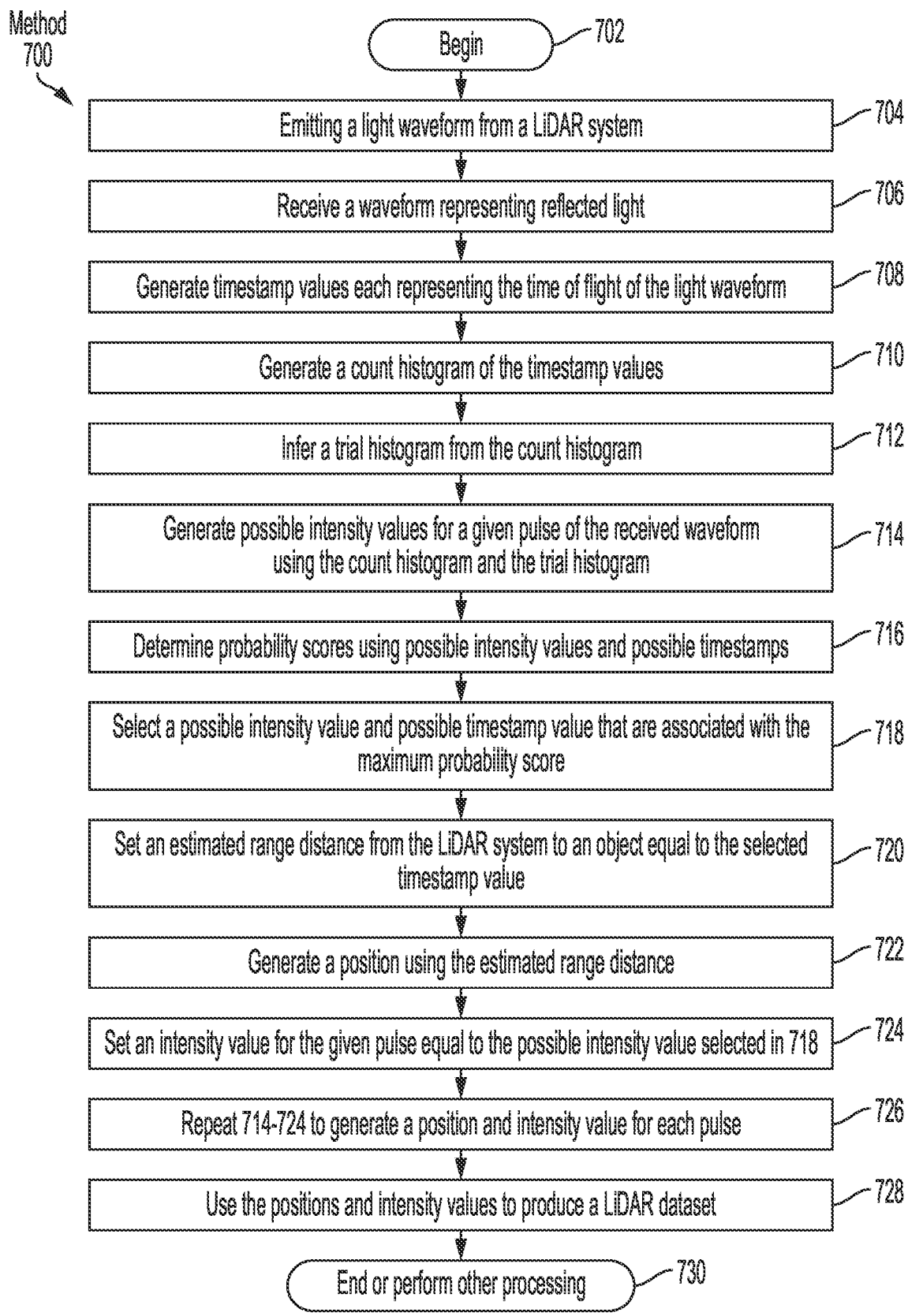
FIG. 7 provides a flow diagram of an illustrative method for producing a LiDAR dataset in accordance with the present solution.

Referring now to FIG. 7, there is provided a flow diagram of an illustrative method 700 for producing a LiDAR dataset. Method 700 can be at least partially performed by a processor (e.g., processor 322 of FIG. 3 and/or CPU 406 of FIG. 4), a LiDAR system (e.g., LiDAR system 264 of FIG. 2 and/or 300 of FIG. 3) and/or a computing device (e.g., computing device 110 of FIG. 1, vehicle on-board computing device 220 of FIG. 2 and/or computing device 400 of FIG. 4). The LiDAR dataset can be used in a variety of applications. For example, the LiDAR dataset can be used to control operations of a vehicle (e.g., AV $102_1$ of FIG. 1) (e.g., via object detection, object classification, feature detection/extraction, and/or LiDAR point classification (e.g., ground, vegetation, building, water, rail, road, surface, wire, bridge, vehicle, etc.)). As such, the LiDAR dataset may be used in at least block 605 of FIG. 6 to detect an object in proximity to the AV and/or in block 606 to generate trajectory(ies) for the detected object.

As shown in FIG. 7, method 700 begins with 702 and continues with 704 where light is emitted from a light emitter system (e.g., light emitter system 304 of FIG. 3) of a LiDAR system (e.g., LiDAR system 264 of FIG. 2). The light is emitted in the form of a waveform including a sequence of pulses (e.g., 100 pulses of light at 1 ms intervals). In 706, a light detector (e.g., light detector 308 of FIG. 3) of the LiDAR system receives a waveform representing reflected light. The light detector can include one or more photodetectors positioned and configured to receive light reflected back into the LiDAR system from at least one object (e.g., vehicle $102_2$ of FIG. 1, cyclist 114 of FIG. 1 and/or pedestrian 116 of FIG. 1). The photodetector(s) can include, but is(are) not limited to, a GmAPD detector that detects photons and produces electrical pulses of sufficient amplitudes to directly trigger logic events in a readout circuit coupled thereto. The readout circuit digitally counts and/or time stamps photon detection events. Accordingly, N timestamp values are generated in 708. Each timestamp value represents a Time Of Flight (TOF) of a given pulse in the light waveform. N is an integer equal to the total number of light pulses emitted in 704 (e.g., 100 pulses). The timestamp values may be subsequently processed by the LiDAR system and/or communicated from the LiDAR system to an external computing device.

In 710, a count histogram of the timestamp values is generated by the computing device (e.g., computing device 110 of FIG. 1, vehicle on-board computing device 220 of FIG. 2 and/or computing device 400 of FIG. 4). The count histogram may comprise a one dimensional graph plotting the N timestamp values. An illustrative count histogram 1000 is provided in FIG. 10.

Figure 10:
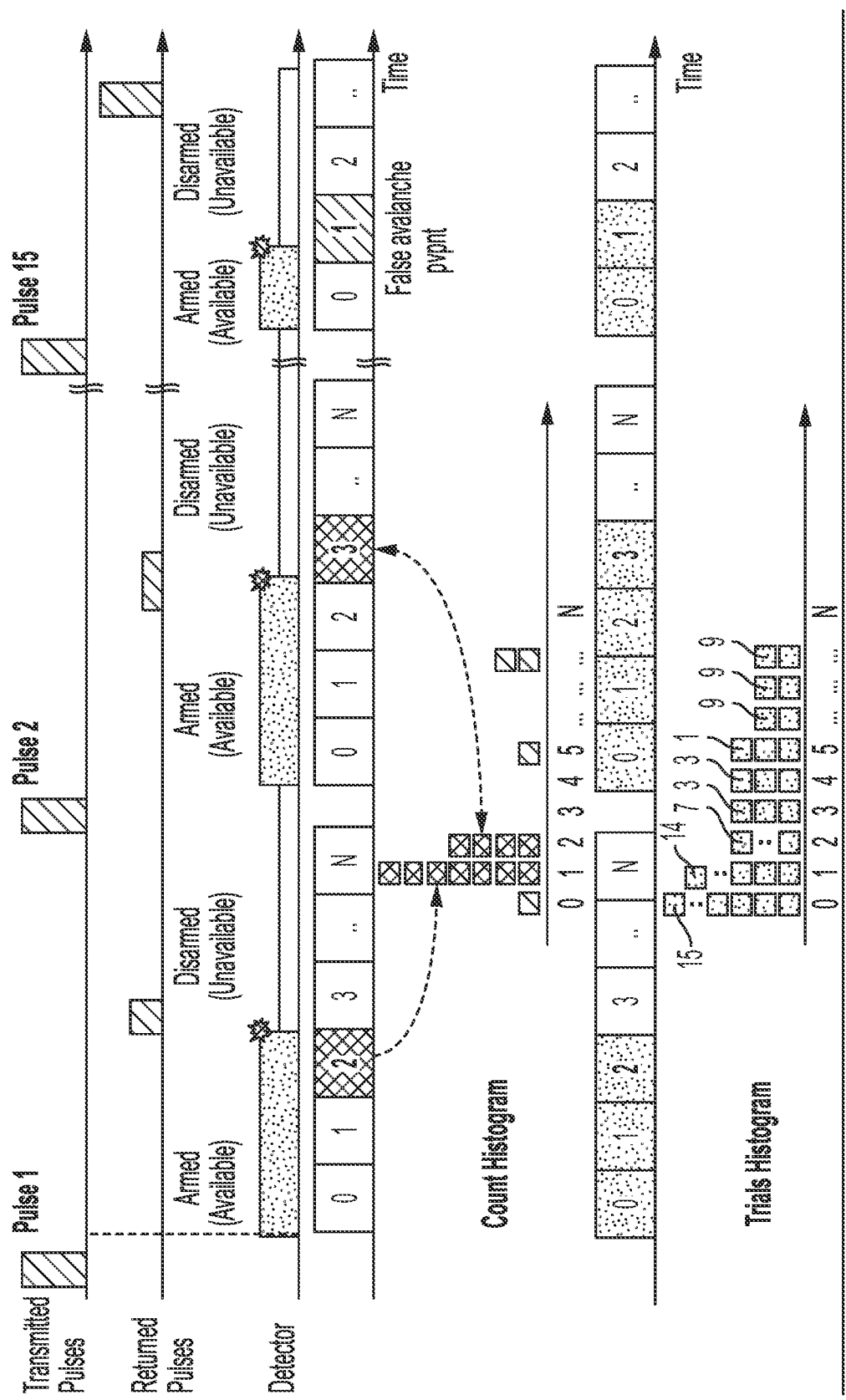
FIG. 10 provides an illustrative count histogram and an illustrative trials histogram.

In 712, a trials histogram is inferred from the count histogram. The trials histogram represents how many times a photodetector of the LiDAR system was available during the N pulse detections of the received waveform. The histograms shown in FIG. 10 illustrates the concept of availability and trials. FIG. 10 shows 15 different range gates. At each range gate, a single pulse is emitted and a single photon detection event is captured (avalanche event). The detector is armed at the beginning of the range gate after sending the pulse. As a result, the detector is considered "available" for detection until an avalanche event is detected. Then the detector is disarmed until the end of the rang gate. During the disarming period, the detector is not available for detection. The trial measurement tracks how many times each bin was available for detection. In the first range gate, an event is captured at bin index 2. As a result, the detector was available for bins 0 to 2. In the second range gate, an event is captured at bin index 3. The detector was available from bins 0 to 3. Similarly, in the last range gate (15), an event is captured at bin index 1. Hence, bins 0 to 1 were available. The avalanche event bin indices are aggregated from all integrated range gates (15 gates) to generate the count histogram. Also, all the trial recordings are aggregated for each range gate to generate the trials histogram. Conceptually, trials histogram can be inferred from the count histogram where the first bin contains the maximum number of pulses being integrated (15) and then for each following bin, the number of trials is adjusted based on avalanche history: Trials[j]=Max_trials−cumsum(avalanches[0:j−1]). The trial at bin j is equal to the maximum number of trials minus the sum of all avalanches from bin 0 to bin j−1.

In 714, possible intensity values for a given pulse of the received waveform is generated using the count histogram and the trials histogram. The return strength of a pulse depends on the reflectivity of the object. Thus, the present solution involves computing a plurality of possible intensity values $\lambda_j$ given a known pulse shape, where j is a pre-defined integer (e.g., 1-20). Each intensity value $\lambda_j$ is generated in accordance with the following mathematical equation (1) implementing a linear combination of the count histogram and the trials histogram.

$$\lambda_j = \frac{\sum_{i=0}^{S-1} k_i}{\sum_{i=0}^{S-1}\left(n_i - \frac{k_i}{2}\right)f(i, \tau = j)} \quad (1)$$

where s represents a span size of the entire count histogram (e.g., a window size of the count histogram is 100 ms) or a given portion of the count histogram (e.g., 10 ms), f(i, τ=j) represents a known pulse shape of a waveform at bin index i that has a centroid at waveform offset r (i.e., a sequence of numbers that represent the pulse shape which add to one), $n_i$ represents a trials count at bin i, i represents a location of a bin index in the trials histogram that corresponds to the pulse, and $k_i$ represents a count number of a given pulse detection event for this light waveform at bin index i.

Figure 11:
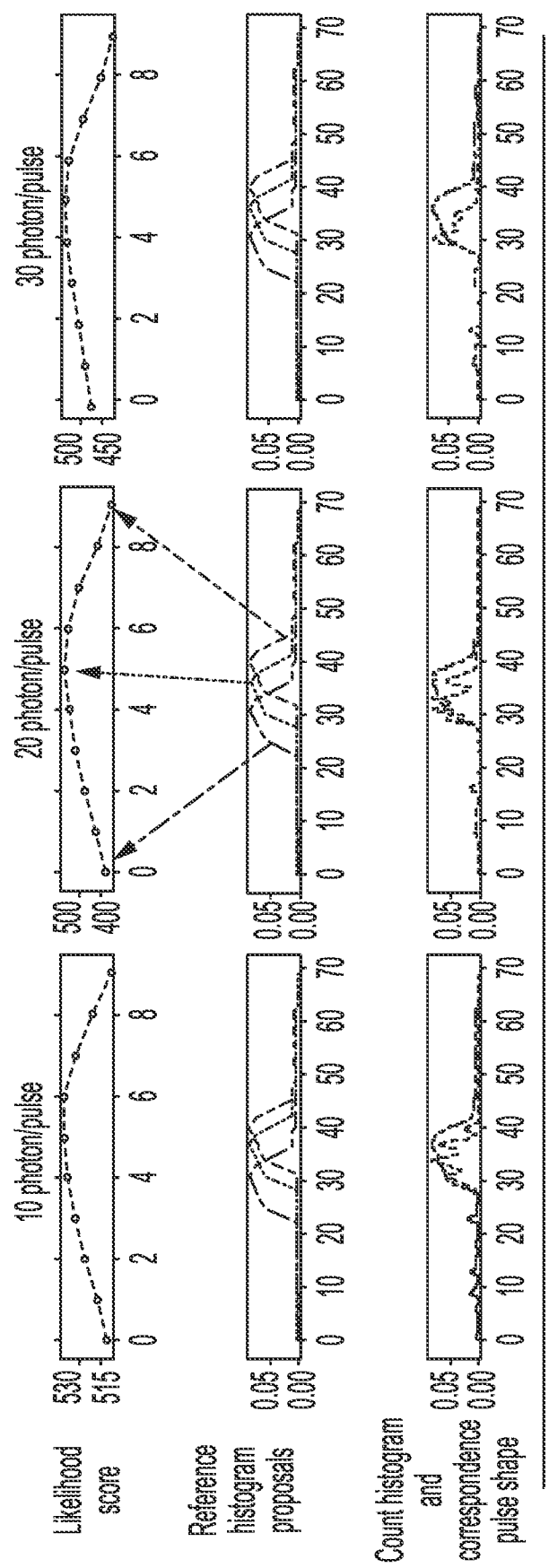
FIG. 11 provides an illustrative reference histogram, and is useful for understanding the role of likelihood score and reference histogram proposal of the present solution.

In 716, probability scores $L_j$ are determined using the possible intensity values and possible timestamp values. The probability scores $L_j$ are determined by comparing the count histogram to each of a plurality of reference histograms given certain conditions. An illustrative reference histogram 1100 is provided in FIG. 11. FIG. 11 explains the role of likelihood score and reference histogram proposal. More specifically, FIG. 11 shows the count histogram obtained when the received intensity is 10, 20 and 30 photons per pulse. The detector is sensitivity is 20% compared to the detector used in FIG. 12. The top part of the figure demonstrates the likelihood values associated with each reference histogram proposal (shown in the middle part of the figure). In the middle part, three proposal histogram are shown (the smallest offset, optimal offset and largest offset proposal). It is shown how the optimal offset remains almost at the same bin location (bin index 5) despite the varying received intensity conditions. This shows the effectiveness of this algorithm against range walking effect in count histogram.

Each comparison operation may be implemented by the following mathematical equation (2). Mathematical equation (2) determines a probability score Lj representing a probability that the measured timestamp values were caused by given possible values for parameters $\tau_j$ and $\lambda_j$.

$$L_j(\text{score}) = \sum_{i=0}^{s-1} k_i \log(1 - e^{-\lambda f(i,\tau=j)}) - (n_i - k_i)\lambda f(j, \tau = j) \quad (2)$$

where λ represents a given previously computed intensity value $\lambda_j$, and τ represents a timestamp value which is set to a pre-defined value j associated with the given previously computed intensity value $\lambda_j$. A number of iterations of mathematical equation (2) are performed respectively using a plurality of possible j values for timestamp τ and the plurality of computed values for intensity $\lambda_j$. Each iteration provides a set of numbers including a probability score, an intensity value and a timestamp value. Illustrative sets of numbers are provided below.

probability score $L_1$, intensity $\lambda_1$, timestamp τ=1
probability score $L_2$, intensity $\lambda_2$, timestamp τ=2
. . .
probability score $L_{20}$, intensity $\lambda_{20}$, timestamp τ=20

In 718, a possible intensity value and a possible timestamp value are selected from those used to generate the probability scores $L_1, L_2, \ldots, L_j$. For example, an intensity value is selected from intensity values $\lambda_1, \lambda_2, \ldots, \lambda_{20}$, and a timestamp value is selected from timestamp values τ=1, 2, . . . , 20. The selected values are associated with the maximum probability score (e.g., the probability score with the highest value). For example, probability score $L_2$ is the maximum probability score of the probability scores $L_1, L_2, \ldots, L_{20}$. Thus, intensity value $\lambda_2$ and timestamp value τ=2 are selected. The present solution is not limited to the particulars of this example.

In 720, an estimated range distance d from the LiDAR system to an object is set equal to the selected timestamp value $\tau_j$. The estimated range distance d may be defined by the following mathematical equation (3).

$$d = \underset{j}{\text{argmax}} L_j \quad (3)$$

For example, the estimated range distance d is set equal to 2 when timestamp value τ=2 is selected in 718. The present solution is not limited to the particulars of this example.

In 722, the computing device generates a position using the estimated range distance d. The position may be generated based additionally on the location of the LiDAR system, an orientation of the LiDAR system, and/or an angle of the LiDAR system. The position is defined in terms of an x-coordinate, a y-coordinate, and a z-coordinate. The x-coordinate may be generated in accordance with the following mathematical equation (4). The y-coordinate may be generated in accordance with the following mathematical equation (5). The z-coordinate may be generated in accordance with the following mathematical equation (6).

$$x = d*\sin(ev)*\cos(az) \quad (4)$$

$$y = d*\sin(ev)*\sin(az) \quad (5)$$

$$z = d*\cos(az) \quad (6)$$

where d is the measured distance in meters, az is the horizontal angle from the X axis (azimuth), and ev is the vertical angle from the Z axis (elevation).

The above described operations of blocks 714-724 are repeated to generate a position and an intensity value for each pulse in the received waveform, as shown by 726. The positions and intensity values are then used in 728 to produce a LiDAR dataset. The LiDAR dataset comprises a plurality of data points defining a point cloud. Each data point is defined at least by a respective position and a respective intensity value. Subsequently, 730 is performed where method 700 ends or other operations are performed. These other operations can include, but are not limited to, controlling operations of a vehicle (e.g., AV $102_1$ of FIG. 1) (e.g., for feature detection/extraction, LiDAR point classification (e.g., ground, vegetation, building, water, rail, road surface, wire, bridge, vehicle, etc.), object trajectory generation, and/or vehicle trajectory generation).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a LiDAR system, comprising:
receiving, by the LiDAR system, a waveform representing light which was reflected off of a surface of at least one object;

generating, by the LiDAR system, a plurality of timestamp values for photon detection events triggered by pulses in the waveform;

generating, by a processor, a count histogram of the timestamp values;

inferring, by the processor, a trials histogram from the count histogram, the trials histogram representing a number of times a photodetector of the LiDAR system was available during reception of the waveform;

generating an estimated range distance from the LiDAR system to the at least one object and an estimated intensity value for a given pulse of the waveform, based on results from analyzing the count histogram and the trials histogram;

determining, by the processor, a position using the estimated range distance from the LiDAR system to the at least one object; and producing, by the processor, a LiDAR dataset comprising a data point defined by the position and the estimated intensity value.

2. The method according to claim 1, wherein the estimated intensity value represents an estimate value for a return strength of a pulse.

3. The method according to claim 1, wherein the estimated intensity value is set equal to a maximum likelihood estimation of pulse intensity given a pulse shape, the count histogram and the trials histogram.

4. The method according to claim 3, wherein the maximum likelihood estimation of pulse intensity is selected from a plurality of possible intensity values each determined using a linear combination of the count histogram and the trials histogram.

5. The method according to claim 4, wherein each of the plurality of intensity values is determined in accordance with mathematical equation $$\lambda_j = \frac{\sum_{i=0}^{S-1} k_i}{\sum_{i=0}^{S-1} \left(n_i - \frac{k_i}{2}\right) f(i, \tau = j)} \quad (1)$$

where s represents a span size of at least a portion of the count histogram, $f(i, \tau=j)$ represents a known pulse shape of a waveform at bin index i that has a centroid at waveform offset $\tau$, $n_i$ represents a trials count at bin i, i represents a location of a bin index in the trials histogram that corresponds to a given pulse, and $k_i$ represents a count number of a given pulse detection event at bin index i.

6. The method according to claim 1, wherein the estimated range distance is set equal to a maximum likelihood estimation of range distance given a plurality of possible intensity values.

7. The method according to claim 6, wherein the maximum likelihood estimation of range distance is determined by performing comparison operations in which the count histogram is compared with a plurality of computed reference histograms given certain conditions.

8. The method according to claim 7, wherein each of said comparison operations produces a probability score representing a probability that the timestamp values were caused by given possible values for parameters $\tau_j$ and $\lambda_j$.

9. The method according to claim 8, wherein the probability score is defined by mathematical equation $$L_j(\text{score}) = \sum_{i=0}^{s-1} k_i \log\left(1 - e^{-\lambda f(i, \tau=j)}\right) - (n_i - k_i)\lambda f(j, \tau = j)$$

were s represents a span size of at least a portion of the count histogram, $f(i, \tau=j)$ represents a known pulse shape of a waveform at time index i that has a centroid at time index $\tau$, $n_i$ represents a trials count at bin i, i represents a location of a timestamp value in the trials histogram that corresponds to a given pulse, $k_i$ represents a count number of a given pulse detection event, $\lambda$ represents a given previously computed intensity value $\lambda_j$, and $\tau$ represents a timestamp value which is set to a pre-defined value j associated with the given previously computed intensity value $\lambda_j$.

10. The method according to claim 1, further comprising using the LiDAR dataset to control operations of an autonomous vehicle.

11. A system, comprising:

a processor;

a non-transitory computer-readable storage medium comprising programming instructions that are configured to cause the processor to implement a method for operating a LiDAR system, wherein the programming instructions comprise instructions to:

generate a plurality of timestamp values for photon detection events triggered by pulses in a received waveform representing light which was reflected off of a surface of at least one object;

generate a count histogram of the timestamp values;

infer a trials histogram from the count histogram, the trials histogram representing a number of times a photodetector of the LiDAR system was available during reception of the waveform;

generate an estimated range distance from the LiDAR system to the at least one object and an estimated intensity value for a given pulse of the received waveform, based on results from analyzing the count histogram and the trials histogram;

determine a position using the estimated range distance from the LiDAR system to the at least one object; and produce a LiDAR dataset comprising a data point defined by the position and the estimated intensity value.

12. The system according to claim 11, wherein the estimated intensity value represents an estimate value for a return strength of a pulse.

13. The system according to claim 11, wherein the estimated intensity value is set equal to a maximum likelihood estimation of pulse intensity given a pulse shape, the count histogram and the trials histogram.

14. The system according to claim 13, wherein the maximum likelihood estimation of pulse intensity is selected from a plurality of possible intensity values each determined using a linear combination of the count histogram and the trials histogram.

15. The system according to claim 14, wherein each of the plurality of intensity values is determined in accordance with mathematical equation $$\lambda_j = \frac{\sum_{i=0}^{S-1} k_i}{\sum_{i=0}^{S-1}\left(n_i - \frac{k_i}{2}\right) f(i, \tau = j)} \quad (1)$$

where s represents a span size of at least a portion of the count histogram, f(i, τ=j) represents a known pulse shape of a waveform at bin index i that has a centroid at waveform offset τ, $n_i$ represents a trials count at bin i, i represents a location of a bin index in the trials histogram that corresponds to a given pulse, and $k_i$ represents a count number of a given pulse detection event at bin index i.

16. The system according to claim 11, wherein the estimated range distance is set equal to a maximum likelihood estimation of range distance given a plurality of possible intensity values.

17. The system according to claim 16, wherein the maximum likelihood estimation of range distance is determined by performing comparison operations in which the count histogram is compared with a plurality of computed reference histograms given certain conditions.

18. The system according to claim 17, wherein each of said comparison operations produces a probability score representing a probability that the timestamp values were caused by given possible values for parameters $\tau_j$ and $\lambda_j$.

19. The system according to claim 18, wherein the probability score is defined by mathematical equation $$L_j(\text{score}) = \sum_{i=0}^{s-1} k_i \log(1 - e^{-\lambda f(i,\tau=j)}) - (n_i - k_i)\lambda f(j, \tau = j)$$

were s represents a span size of at least a portion of the count histogram, f(i, τ=j) represents a known pulse shape of a waveform at time index i that has a centroid at time index τ, $n_i$ represents a trials count at bin i, i represents a location of a timestamp value in the trials histogram that corresponds to a given pulse, $k_i$ represents a count number of a given pulse detection event, λ represents a given previously computed intensity value $\lambda_j$, and τ represents a timestamp value which is set to a pre-defined value j associated with the given previously computed intensity value $\lambda_j$.

20. The system according to claim 11, further comprising using the LiDAR dataset to control operations of an autonomous vehicle.

* * * * *